Examiner
W. E. Kidd.
Bonnet.
No. 959
Reissued May 15, 1860.
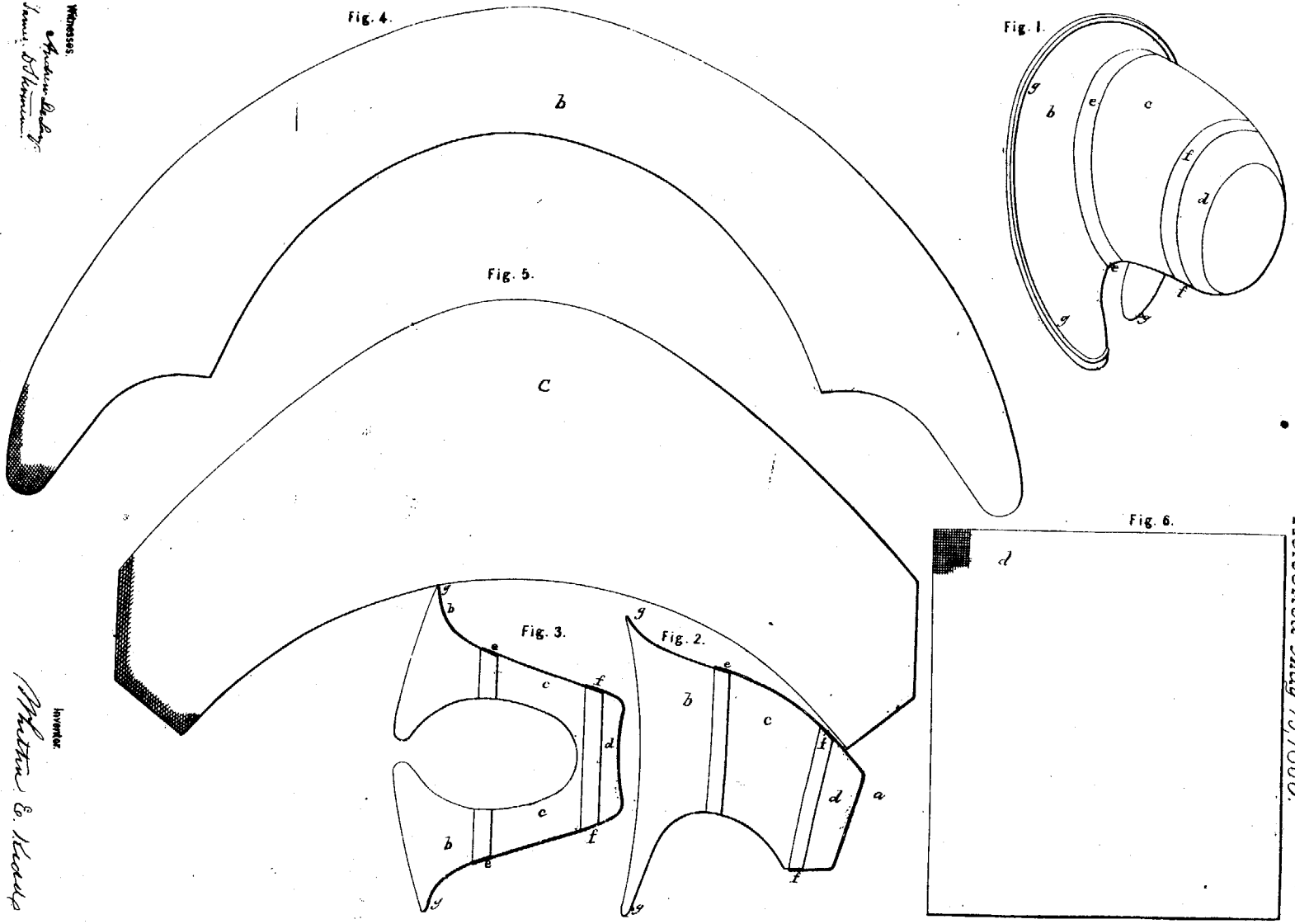
Witnesses.
Andrew Dealey
James D. Kennedy
Inventor.
Whitten E. Kidd

BEST AVAILABLE COPY

UNITED STATES PATENT OFFICE.

WHITTEN E. KIDD, OF NEW YORK, N. Y.

IMPROVEMENT IN BONNET-FRAMES.

Specification forming part of Letters Patent No. 19,932, dated April 13, 1858; Reissue No. 959, dated May 15, 1860.

*To all whom it may concern:*

Be it known that I, WHITTEN E. KIDD, of the city, county, and State of New York, have invented a new and useful Improvement in the Method of Making Ladies' Bonnet-Frames of cape Net; and I do hereby declare that the following is a full, clear, and exact description thereof, reference being had to the accompanying drawings, making part of this specification, in which—

Figure 1 is a perspective view of a net bonnet-frame made according to my improved method. Fig. 2 is a vertical section through the front, crown, and tip; Fig. 3, a horizontal section taken at the lines A *a* of Fig. 2; and Figs. 4, 5, and 6 separate views of the pieces, as cut for making the front, crown, and tip.

The same letters indicate like parts in all the figures.

Prior to my invention net frames for ladies' bonnets have been generally made of a single thickness of cape net sewed onto a previously-formed wire frame to give them the required shape and strength, which not only makes them too heavy, and, from the want of elasticity, liable to remain out of shape when subjected to accidental pressure. On account of these objections it has long been desired to make bonnet-frames of cape net which would retain the required shape without the employment of so many wire stays, but I believe that prior to my invention all such attempts have failed to produce the required result.

The mode of application of my said invention is as follows, viz: I cut out of two thicknesses of cape net two pieces, Fig. 4, to make the front, *b*, two others, Fig. 5, to make the band *c* for the crown, and two others, Fig. 6, to make the tip *d* of the crown; but for greater expedition in working I cut some twenty (more or less) thicknesses at once, as the material is very thin and easily cut. Having cut the parts in this way I take three thicknesses of the material known as "buckram" or other equivalent substance, moisten one of them with water by rubbing it over with a soft brush dipped in water, or in any other suitable manner, and lay it between the two dry ones. On these I pile twenty (more or less) thicknesses of the cape net, cut as before stated, and on top I lay three thicknesses of buckram prepared in like manner as those placed below, and on top of that I pile another batch of pieces of cape net, and so proceed until I get the desired quantity, depending on the number of frames to be made; and on top of this pile I lay a board with a weight, to make a slight pressure, and there let it remain over night, when the whole pile will be found to be slightly moistened. The next day I take the pieces, two at a time, and subject them to pressure between heated metallic molds of the required configuration, by which they will be made to assume the form of the surface thereof, the heat and moisture having the further effect of causing the fibers of the two thicknessess of net to unite where they come in contact, the heat and moisture having the effect to partially dissolve the slightly glutinous substance or sizing employed in the dressing of the fabric, and then to dry it to induce the cementing. The fronts, the bands, and the tips having been thus shaped, and the two thicknesses united, the three parts—viz., tip, band, and front—are then united by lapping over each other, as at *e* and *f*, and by the application of moisture, heat, and pressure, as in the well-known process of making bonnet-frames of the fabric known as buckram, and after the double thicknesses are united and shaped, and the parts are put together in the manner described, the edge of the bonnet-frame is further strengthened, if desired, by securing thereto a wire binding, *g*.

When thus made, bonnet-frames will be much lighter than when made of a single thickness sewed to a wire skeleton frame, more perfect in shape, for every part will have taken the form of the molds in which they were pressed, and much more elastic to yield to pressure and resume their shape when relieved from such pressure, for the reason that the two thicknesses are cemented to each other by the same operation which imparts the form.

Although I have above described the mode of procedure for making the entire bonnet-frame, and have stated that such frames are made in three parts—viz., the front, the band, and the tip—I do not wish to be understood as limiting my claim of invention to the making of such frames entire, as it will be obvious that the crown, consisting of the band and tip, and which constitutes the essential part of a bonnet-frame, may be thus formed, and then a front or rim made in any other manner added thereto. Nor do I wish to be understood as limiting my claim of invention to the making of the crown in two parts—viz., the band and the tip; nor to the making of the entire frame in three separate parts—viz., the tip, the band, and the front—and then uniting them, as the entire crown or the entire frame may be made in one piece of two separate thicknesses, united by heat and pressure in the act of imparting the required shape.

I am aware that prior to my said invention frames for ladies' bonnets have been made of a single thickness of net pressed or molded into shape by heat and pressure; but in such cases the required strength or stiffness was imparted to the fabric before forming the bonnet-frame by dressing the net with a preparation of rice, such fabric being known in the trade by the appellation of "rice lace," but such bonnet-frames were not only inferior to those made on my improved plan, but more expensive, by reason of the greater cost of the fabric employed; and I am also aware that prior to my invention bonnet-frames have in some instances been made of two thicknesses of cape net, by stretching them while in a moist state over a block of the required form and there securing them until dry, and then applying a sad-iron to the surface to smooth down the wrinkles or folds; but bonnet-frames so made were not only more expensive than when made on my improved plan, but less perfect, for the reason that the molding and final shaping were distinct operations, and hence the final form was imperfect and the union lessperfectly obtained; and I am also aware that bonnet-frames have been made, long prior to my said invention, of two thicknesses of the material known as buckram, but in such cases the two thicknesses were not united in the act of forming the bonnet-frame, but in the piece, and so cut out and formed into bonnets, and besides the fabric is very different from cape net.

I do not, therefore, wish to be understood as making claim, broadly, to the use of heated molds in making bonnet-frames, nor to the making of bonnet frames of two thicknesses of cape net or any other fabric; but What I do claim as my invention, and desire to secure by Letters Patent in the manufacture of ladies' bonnet-frames, is—

1. Making the tip of bonnet-frames of two separate thicknesses of the fabric known as cape net by subjecting the same while in a moist state to heat and pressure in metallic molds of the required form to impart the required shape and effect the union of the two thicknesses at one and the same operation, substantially as described.

2. Making the crown of bonnet-frames of two separate thicknesses of the fabric known as cape net by subjecting the same while in a moist state to heat and pressure in metallic molds of the required form to impart the required shape and effect the union of the two thicknesses at one and the same operation, substantially as described.

3. Making the entire bonnet-frame of two separate thicknesses of the fabric known as cape net by subjecting the same while in a moist state to heat and pressure in metallic molds of the required form to impart the required shape and effect the union of the two thicknesses at one and the same operation, substantially as described.

WHITTEN E. KIDD.

Witnesses:
JAMES D. STEVENSON,
ANDREW DE LACY.